United States Patent
Wang et al.

(10) Patent No.: US 11,494,361 B2
(45) Date of Patent: Nov. 8, 2022

(54) AUTOMATIC BUILDING, VERIFYING, AND SECURING OF A MASTER DATA LIST

(71) Applicant: Capital One Services, LLC, McLean, VA (US)

(72) Inventors: Jeffrey Wang, Boyds, MD (US); Miao Cao, Falls Church, VA (US); Magdalena Grazyna Castaneda, Herndon, VA (US); Joseph Chapman, Bethesda, MD (US)

(73) Assignee: Capital One Services, LLC, McLean, VA (US)

( * ) Notice: Subject to any disclaimer, the term of this patent is extended or adjusted under 35 U.S.C. 154(b) by 45 days.

(21) Appl. No.: 17/164,152

(22) Filed: Feb. 1, 2021

(65) Prior Publication Data
US 2022/0245114 A1    Aug. 4, 2022

(51) Int. Cl.
*G06F 16/22* (2019.01)
*G06F 16/28* (2019.01)
*G06F 16/23* (2019.01)

(52) U.S. Cl.
CPC ...... *G06F 16/2272* (2019.01); *G06F 16/2358* (2019.01); *G06F 16/288* (2019.01)

(58) Field of Classification Search
CPC . G06F 16/2272; G06F 16/288; G06F 16/2358
See application file for complete search history.

(56) References Cited

U.S. PATENT DOCUMENTS

| 6,035,297 A * | 3/2000 | Van Huben | G06F 16/25 707/999.008 |
| 6,253,213 B1 * | 6/2001 | Vanderschaaf | G06F 16/2365 707/999.203 |
| 7,210,996 B2 | 5/2007 | Rehm et al. | |
| 10,346,382 B1 * | 7/2019 | Voytko | G06F 16/23 |
| 2006/0112107 A1 * | 5/2006 | Jones | G06F 16/27 |

(Continued)

OTHER PUBLICATIONS

Ivins, Tammy, "Data-driven decisions: Creating automated reports with data from multiple Google Forms," College & Research Libraries News, vol. 77, No. 2 (2016), available at https://crln.acrl.org/index.php/crlnews/article/view/9447/10682.

(Continued)

*Primary Examiner* — James Trujillo
*Assistant Examiner* — Michal Bogacki
(74) *Attorney, Agent, or Firm* — Harrity & Harrity, LLP

(57) ABSTRACT

In some implementations, a system may receive, from a first user, data associated with a new database entry to be added to a master database that is associated with multiple sets of users having different access permissions to entries in the master database. The system may write the data to a first repository, write an entry including the data to a master repository, and generate a record of the entry. The system may receive, from a second user, additional data associated with the new database entry. The system may write the additional data to a second repository, modify the entry in the master repository based on the additional data, and generate a record of the modified entry. The system may perform verifications and output a notification based on the verifications. The system may further output, to a public repository, the modified entry with at least one data value removed.

20 Claims, 9 Drawing Sheets

(56) References Cited

U.S. PATENT DOCUMENTS

2015/0281247 A1* 10/2015 Obbard .............. G06F 21/6209
726/1
2021/0103576 A1* 4/2021 Chan .................. G06F 16/2343

OTHER PUBLICATIONS

O'Connor et al., Final Report: CS Information Session Reservation (2020), available at https://vtechworks.lib.vt.edu/bitstream/handle/10919/98264/CSInformationSessionFinalReport.pdf.

* cited by examiner

200 →            1st Form

---

Object Name *

Test Name

---

Purpose *

Testing

---

Division *

[ HR ▽ ]

---

Business Unit *

[ Benefits ▽ ]

---

Business Sub-Unit

PTO team

---

Owner *

Todd

---

Environments*
For example, if you have a Python script running on your laptop that retrieves data from OneLake, the environment would be Local Laptop. If you have a Python script running in a VDI, and you access that VDI through your laptop, the environment would be VDI.

☐ AWS
☑ Local Laptop
☐ VDI

---

Sensitive Data Classification*

☐ NPI
☐ PCI
☐ API
☐ N/A

---

[ Next ]

2nd Form      252

| Standard Name* |
| DO NOT MODIFY! This is reference for which object this form corresponds to. Any modification will be reflected in the form, but will not appear in the sheet. |
| 47 |

254 →

| Division* |
| DO NOT MODIFY! This is reference for which object this form corresponds to. Any modification will be reflected in the form, but will not appear in the sheet. |
| HR ▽ |

Overall Risk
○ High
○ Medium
○ Low
○ Immaterial

Severity

|  | High | Medium | Low | Little or No |
|---|---|---|---|---|
| Exposure | ○ | ○ | ○ | ○ |
| Impact | ○ | ○ | ○ | ○ |

Notes
N/A

Validation/ Documentation Folder Links
/project47/docs/

Approved Risk Assessment Link
/project47/assessment.docx

[ Submit ]

FIG. 2B

AUTOMATIC BUILDING, VERIFYING, AND SECURING OF A MASTER DATA LIST

BACKGROUND

Maintenance of centralized data lists generally relies on collaboration between multiple users. For example, a software inventory may rely on input from front-line engineers, verification from one or more supervisors or managers, and additional input from business managers or product specialists. Thus, collation of data across users as well as error-checking are important tasks for maintaining data lists. Additionally, centralized data lists should be secured so as to prevent unauthorized access and tampering.

SUMMARY

In some implementations, a system for automatically building and securing a master data list includes one or more memories and one or more processors, communicatively coupled to the one or more memories, configured to receive, based on input received in association with a first account, data associated with a new list item; write, to a first repository that is restricted to a first set of users, the data associated with the new list item to be added to a master list that is associated with multiple sets of users having different access permissions to items in the master list; write, to a master repository that is restricted to a second set of users, an entry including the data associated with the new list item; generate, in a record repository that is restricted to a third set of users, a record of the entry to the master repository; generate, based on receiving the data associated with the new list item, a form associated with the new list item; receive, based on input received in association with a second account and using the form, additional data associated with the new list item; write, to a second repository that is restricted to the first set of users, the additional data associated with the new list item; modify, in the master repository, the entry including the data associated with the new list item based on the additional data associated with the new list item; generate, in the record repository, a record of the modified entry; and output, to a public repository and based on the master repository, the modified entry with at least one data value removed.

In some implementations, a method of automatically building and verifying a master data list includes receiving, based on input associated with a first user and using a first form, data associated with a new database entry to be added to a master database that is associated with multiple sets of users having different access permissions to entries in the master database; writing, to a first repository, the data associated with the new database entry; writing, to a master repository, an entry including the data associated with the new database entry; generating, in a record repository, a record of the entry to the master repository; generating, based on receiving the data associated with the new database entry, a second form associated with the new database entry; receiving, based on input associated with a second user and using the second form, additional data associated with the new database entry; writing, to a second repository, the additional data associated with the new database entry; modifying, in the master repository, the entry including the data associated with the new database entry based on the additional data associated with the new database entry; generating, in the record repository, a record of the modified entry; performing a plurality of verifications including: verifying that an identifier associated with the data in the first repository corresponds to an identifier associated with the additional data in the second repository, verifying that the modified entry in the master repository corresponds to the data in the first repository and the additional data in the second repository, and verifying that the modified entry in the master repository corresponds to the record of the entry and the record of the modified entry in the record repository; and outputting a notification based on the plurality of verifications.

In some implementations, a non-transitory computer-readable medium storing a set of instructions for automatically building and securing a master data list includes one or more instructions that, when executed by one or more processors of a device, cause the device to receive input, associated with one user of a first set of users, that includes data associated with a new list item to be added to a master list that is associated with multiple sets of users having different access permissions to items in the master list; write, to a first repository that is not accessible by the first set of users, the data associated with the new list item; write, to a master repository that is not accessible by the first set of users, an entry including the data associated with the new list item; generate, in a record repository that is not accessible by the first set of users, a record of the entry to the master repository; generate, based on receiving the data associated with the new list item, a form associated with the new list item; receive input, associated with one user of a second set of users and using the form, that includes additional data associated with the new list item; write, to a second repository that is not accessible by the first set of users and by the second set of users, the additional data associated with the new list item; modify, in the master repository, the entry including the data associated with the new list item based on the additional data associated with the new list item, wherein the master repository is accessible by the second set of users; and generate, in the record repository, a record of the modified entry, wherein the record repository is not accessible by the second set of users.

BRIEF DESCRIPTION OF THE DRAWINGS

FIGS. 2A and 2B are diagrams of example graphical user interfaces (GUIs) that systems and/or methods described herein may use.

DETAILED DESCRIPTION

Figure 1A:
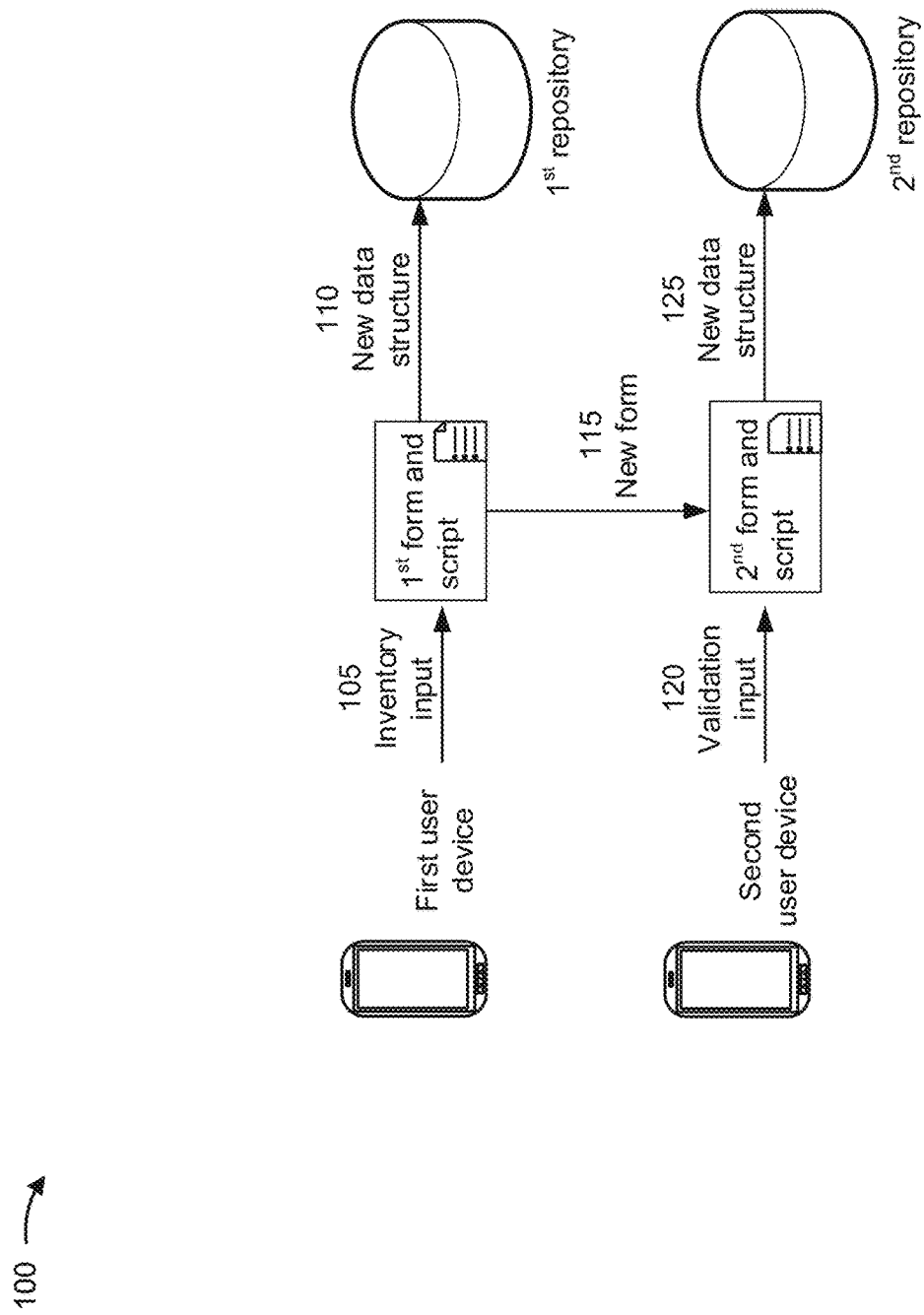
FIGS. 1A, 1B, 1C, and 1D are diagrams of an example implementation relating to automatically building and securing a master data list.

The following detailed description of example implementations refers to the accompanying drawings. The same reference numbers in different drawings may identify the same or similar elements.

Centralized data lists, such as a software inventory list, generally rely on input from multiple users. For example, a software inventory list may rely on input from front-line engineers as well as input from one or more supervisors or managers. Some collaboration tools are cumbersome, such as shared spreadsheets to which first-line users (e.g., engineers) and second-line users (e.g., managers) both have access. Additionally, tools like shared spreadsheets are unsecure because any user with access can tamper with information entered by other users.

Some collaboration tools allow for limited access to data. For example, first-line users can enter information into a spreadsheet via a webpage form. The spreadsheet can then be secured as read-only such that users cannot tamper with the information entered into the spreadsheet. However, the read-only spreadsheet does not allow for second-line users to enter additional information or modify information from the first-line users. Accordingly, information from the first-line users and the second-line users will not be properly collated into a master list.

By providing different forms to first-line users and second-line users, information can be collected from both sets of users without compromising security of spreadsheets in which the information stored. Some implementations described herein enable collation of data from multiple forms corresponding to different sets of users. As a result, a master list is automatically compiled that is both more accurate (e.g., information is collected from multiple sets of users and automatically combined) and is more secure (e.g., the combined information is tamper-proof by being stored in spreadsheets with limited access permissions). By reducing errors and possible tampering, network and processing resources that would normally be consumed by error correction and tamper tracing can be conserved. Additionally, some implementations described herein perform automated error-checking of master lists and automated generation of public versions of the master lists (e.g., by removing sensitive fields and/or data). As a result, user experiences may be improved because error correction and public sharing of the master lists is significantly easier as compared with existing systems.

FIGS. 1A-1D are diagrams of an example 100 associated with automatically building and securing a master data list. As shown in FIGS. 1A-1D, example 100 includes a first user device, a second user device, a third user device, a fourth user device, a first repository, a second repository, a master repository, a record repository, a communication interface, and public repository. These devices are described in more detail in connection with FIGS. 3 and 4.

As shown by reference number 105, the first user device may transmit input to a system (e.g., a system managing the first line storage, the second line storage, the consolidated storage, the system of record (SOR) storage, and/or the publicly accessible storage). For example, the first user device may transmit the input to the system using one or more computer networks. In some implementations, the input may include data associated with a new list item to be added to a master list that is associated with multiple sets of users having different access permissions to entries in the master list. A "list" may comprise a data structure that represents a tuple, such as an array, a linked list, a queue, a stack, and/or another similar data structure.

In some implementations, the new list item may be a new database entry. For example, the new list item may be a new row for insertion in a relational database, a new node for insertion in a graphical database, or another type of new database entry. Accordingly, the master list may be a master database that is associated with multiple sets of users having different access permissions to entries in the master database.

In some implementations, the input may be associated with a first account or first user (or one user of a first set of users). For example, the first user device may transmit the input to the system along with credentials (e.g., a username and password, a key associated with a single sign-on (SSO) session) associated with the first user. In some implementations, the first form may be accessible only by one or more of the first set of users such that the first user device can display the first form only after providing the credentials to the system. Additionally, or alternatively, the first form may capture the credentials associated with the first user when the input is submitted using the first form.

As shown in FIG. 1A, the first user device may transmit the input using a first form. In some implementations, the first form may include one or more components of a first line form as shown in example 200 of FIG. 2A. Accordingly, the system may generate the first form for display on a device associated with the first account, which is the first user device in example 100. The first user may interact with the first form (e.g., via keyboard, mouse, touchscreen, or another input component) to submit the data associated with the new list item using the first form.

Although described below with respect to one first user inputting data associated with the new list item using one first user device, the description similarly applies to a plurality of first users inputting data, associated with new list items, using one or more first user devices. For example, one first user may transmit first data associated with a first new list item (e.g., that is processed as described below in connection with reference numbers 110 and/or 115), and a different first user may transmit second data associated with a second new list item (e.g., that is processed as described below in connection with reference numbers 110 and/or 115).

In some implementations, the system may output, based on receiving the data, a notification including at least a portion of the data associated with the new list item. For example, the notification may include an email, a text message, a chat message, and/or another message to one or more users. In some implementations, the system may output the notification to a second set of users. Accordingly, the system may alert the second set of users to submit additional data associated with the new list item (e.g., using a second form, as described below).

In some implementations, the system may determine which users in the second set of users will receive the notification based on one or more settings. For example, one user in the second set of users may be associated with a stored setting that indicates the system should send the notification to that user, but a different user in the second set of users may be associated with a different stored setting that indicates the system should not send the notification to that user. Additionally, or alternatively, the system may determine which users should receive the notification based on a categorization associated with the new list item or another portion of the data associated with the new list item. For example, the system may select one set of users, associated with a first team, to receive the notification when the new list item is associated with one categorization, and may select a different set of users, associated with a second team, to receive the notification when the new list item is associated with a different categorization.

Additionally, or alternatively, the system may determine which type of notification to send based on one or more settings. For example, the system may send an email to one user in the second set of users based on one stored setting associated with that user, but may send a chat message to a different user in the second set of users based on a different stored setting associated with that user.

In some implementations, the system may determine that the data associated with the new list item satisfies at least one condition and output the notification based on determining that the data satisfies the at least one condition. For example, the system may output the notification based on a determination that the data indicates that the new list item is associated with a particular team, that one portion of the data (e.g., satisfying a confidentiality threshold) is not consistent with another portion of the data (e.g., indicating use of a local or other unencrypted computing device), and/or that the data satisfies another condition.

As shown by reference number 110, the system may write, to the first repository, the data that is associated with the new list item to be added to the master list that is associated with multiple sets of users having different access permissions to items in the master list. For example, the first repository may include a cloud-based storage (such as an Amazon® Relational Database Service (RDS®), a Google® spreadsheet, and/or another cloud-based data storage) and/or a local storage (e.g., a database or other list stored on a locally accessible hard disk or other storage device). The first repository may be restricted to an authorized set of users. For example, the authorized set of users may include a second account or second user. Additionally, or alternatively, the first repository may be inaccessible by the first account or first user (or some or all of the first set of users). Accordingly, the system may protect the data from tampering by users that are not included in the authorized set of users (and/or that are included in the first set of users).

In some implementations, the system may generate an identifier, for association with the data, based on one or more existing identifiers stored in the first repository. For example, the system may determine a quantity of rows, entries, or other items in the master list and generate the identifier based on the quantity. Thus, if the master list includes no items, the system may generate an identifier of "0"; similarly, if the master list includes 12 items, the system may generate an identifier of "12." The system may further write the identifier to the first repository in addition to the data. For example, the system may write the identifier as one column of a new row in the master list, as one attribute of a new node in the master list, or otherwise in association with a new entry or other list item that includes the data.

As shown by reference number 115, the system may generate, based on receiving the data associated with the new list item, a second form associated with the new list item. In some implementations, the second form may include one or more components of a second line form as shown in example 250 of FIG. 2B. Accordingly, the system may generate the second form for display on a device associated with the second account, which is the second user device in example 100.

In some implementations, the system may further populate a first field of the second form with an identifier associated with the new list item. For example, as shown in FIG. 2B, the system may populate form 252 with the identifier. Additionally, or alternatively, the system may populate a second field of the second form with a categorization associated with the new list item. For example, as shown in FIG. 2B, the system may populate form 254 with the categorization.

As shown by reference number 120, the second user device may transmit input to the system. For example, the second user device may transmit the input to the system using one or more computer networks. In some implementations, the input may include additional data associated with the new list item.

In some implementations, the input may be associated with a second account or second user (or one user of a second set of users), as described above. For example, the second user device may transmit the input to the system along with credentials (e.g., a username and password, a key associated with an SSO session) associated with the second user. In some implementations, the second form may be accessible only by one or more of the second set of users such that the second user device can display the second form only after providing the credentials to the system. Additionally, or alternatively, the second form may capture the credentials associated with the second user when the input is submitted using the second form. In some implementations, the second user may interact with the second form (e.g., via keyboard, mouse, touchscreen, or another input component) to submit the additional data associated with the new list item using the second form.

Although described below with respect to one second user inputting additional data associated with the new list item using one second user device, the description similarly applies to a plurality of second users inputting additional data, associated with the new list item, using one or more second user devices. For example, one second user may transmit first additional data associated with the new list item (e.g., that is processed as described below in connection with reference numbers 125, 130, and/or 135), and a different second user may transmit second additional data associated with the new list item (e.g., that is processed as described below in connection with reference numbers 125, 130, and/or 135).

In some implementations, the system may output, based on receiving the additional data, a notification including the identifier associated with the new list item. For example, the notification may include an email, a text message, a chat message, and/or another message to one or more users. In some implementations, the system may output the notification to the second set of users. Accordingly, the system may alert other users in the second set of users to submit further data associated with the new list item.

In some implementations, the system may determine which users in the second set of users will receive the notification based on one or more settings. For example, the system may send the notification to one user in the second set of users based on one stored setting associated with that user and that indicates the system should send the notification to that user, but may refrain from sending the notification to a different user in the second set of users based on a different stored setting associated with that user and that indicates the system should not send the notification to that user. Additionally, or alternatively, the system may determine which users should receive the notification based on the categorization associated with the new list item or another portion of the data and/or the additional data associated with the new list item. For example, the system may send the notification to a set of users associated with a first team based on the new list item being associated with one categorization, and may send the notification to a different set of users associated with a second team based on the new list item being associated with a different categorization.

Additionally, or alternatively, the system may determine which type of notification to send based on one or more settings. For example, the system may send an email to one user in the second set of users based on one stored setting that indicates the system should send emails to that user, but may send a chat message to a different user in the second set of users based on a different stored setting that indicates the system should send chat messages to that user.

In some implementations, the system may determine that the additional data associated with the new list item satisfies at least one condition and output the notification based on determining that the additional data satisfies the at least one condition. For example, the system may output the notification based on a determination that the additional data indicates that the new list item is associated with a threshold level of risk, that one portion of the additional data (e.g., satisfying a confidentiality threshold) is not consistent with another portion of the additional data (e.g., indicating use of a local or other unencrypted computing device), and/or that the additional data satisfies another condition.

As shown by reference number 125, the system may write, to the second repository, the additional data that is associated with the new list item. For example, the second repository may include a cloud-based storage (such as an Amazon® RDS®, a Google® spreadsheet, and/or another cloud-based data storage) and/or a local storage (e.g., a database or other list stored on a locally accessible hard disk or other storage device). The second repository may be restricted to an authorized set of users. In some implementations, the authorized set of users may include at least some users from the second set of users described above. Additionally, or alternatively, the second repository may be inaccessible by the first account or first user (or some or all of the first set of users). In some implementations, the second repository may be further inaccessible by the second account or second user (or some or all of the second set of users). Accordingly, the system may protect the additional data from tampering by users that are not included in the authorized set of users (and/or that are included in the first set of users and/or the second set of users).

Figure 1B:
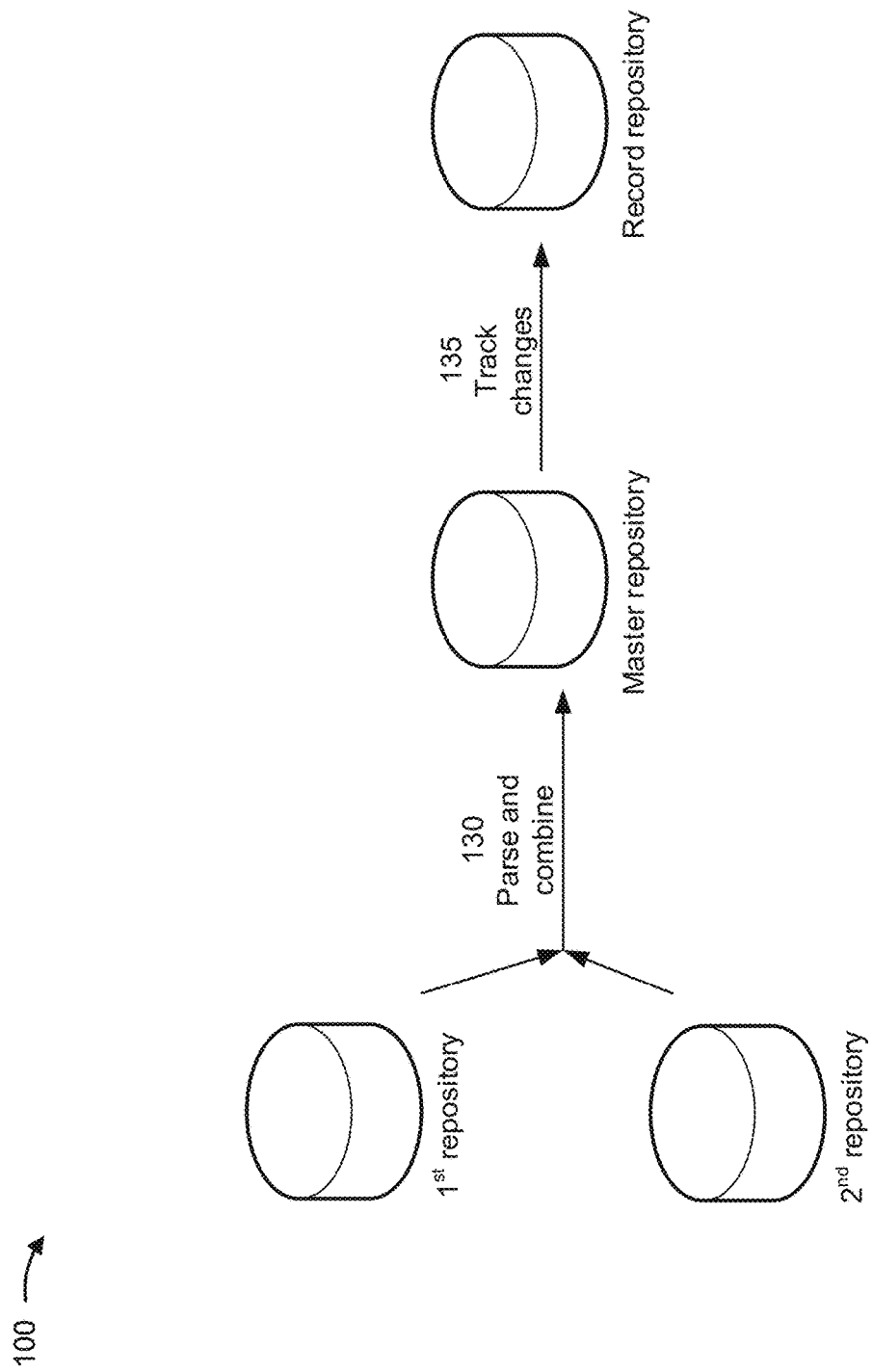

As shown in FIG. 1B, and by reference number 130, the system may write, to the master repository, an entry including the data associated with the new list item. For example, the master repository may include a cloud-based storage (such as an Amazon® RDS®, a Google® spreadsheet, and/or another cloud-based data storage) and/or a local storage (e.g., a database or other list stored on a locally accessible hard disk or other storage device). The master repository may be restricted to an authorized set of users. In some implementations, the authorized set of users may include an administrator and/or at least some users from the second set of users described above. Additionally, or alternatively, the master repository may be inaccessible by the first account or first user (or some or all of the first set of users). In some implementations, the master repository may be further inaccessible by the second account or second user (or some or all of the second set of users). Accordingly, the system may protect the master list from tampering by users that are not included in the authorized set of users (and/or that are included in the first set of users and/or the second set of users).

Additionally, the system may modify, in the master repository, the entry including the data associated with the new list item based on the additional data associated with the new list item. For example, the system may add and/or modify one or more columns of a row, one or more attributes of a node, and/or one or more other portions of the new list item to include the additional data. Accordingly, the system may populate the entry with at least one new data value based on the additional data. In some implementations, the system may map the additional data to the entry based on an identifier associated with the new list item. For example, the additional data may include the identifier that maps to an identifier included in the entry.

As shown by reference number 135, the system may generate, in the record repository, a record of the entry to the master repository. For example, the system may generate a new row, entry, or other list item that records a time and/or date associated with the entry to the master repository along with the data included in the entry. The system may thus copy the entry, along with an associated timestamp, to the record repository. In some implementations, the record repository may include a cloud-based storage (such as an Amazon® RDS®, a Google® spreadsheet, and/or another cloud-based data storage) and/or a local storage (e.g., a database or other list stored on a locally accessible hard disk or other storage device). In some implementations, the record repository may be restricted to an authorized set of users. In some implementations, the authorized set of users may include an administrator. Additionally, or alternatively, the master repository may be inaccessible by the first account or first user (or some or all of the first set of users) and/or by the second account or second user (or some or all of the second set of users). Accordingly, the system may protect the records from tampering by users that are not included in the authorized set of users (and/or that are included in the first set of users and/or the second set of users).

In some implementations, the system may identify the entry based on an identifier associated with the new list item. For example, the data associated with the new list item may include the identifier that maps to an identifier included in the entry.

Additionally, the system may generate, in the record repository, a record of the modified entry. For example, the system may generate a new row, entry, or other list item that records a time and/or date associated with the modified entry to the master repository along with the data included in the modified entry. The system may thus copy the modified entry, along with an associated timestamp, to the record repository.

In some implementations, the system may identify the modified entry based on an identifier associated with the new list item. For example, as described above, the additional data associated with the new list item may include the identifier that maps to an identifier included in the modified entry.

In some implementations, the system may perform batch processing. For example, the system may receive the data associated with the new list item from a database including a plurality of new list items and receive the additional data associated with the new list item from the database including the plurality of new list items. In some implementations, the system may automatically process each new list item in the database by automatically entering responses to the first form for each new list item and by automatically entering responses to the second form for each new list item. Accordingly, the system may trigger processing of each new list item by automatically completing the first and second forms.

The system may allow for the first account or first user to modify the data in the first repository while retaining security of the first repository. For example, the system may generate a hyperlink to the first form for editing the data in the first repository. The system may provide the hyperlink to the first user such that the system can receive, based on input associated with the first user and using the hyperlink, a change to the data associated with the new list item. For example, the first user may access the first form, via the hyperlink and using the first user device (and/or another device associated with the first user or first account) and input the change to the data. Accordingly, the system may modify, in the first repository and based on the change, the data associated with the new list item; modify, in the master repository and based on the change, the entry associated with the new list item; and generate, in the record repository, a record of the change.

Additionally, or alternatively, the system may allow for the second account or second user to modify the additional data in the second repository while retaining security of the second repository. For example, the system may generate a hyperlink to the second form for editing the data in the second repository. The system may provide the hyperlink to the second user such that the system can receive, based on input associated with the second user and using the hyperlink, a change to the additional data associated with the new list item. For example, the second user may access the second form, via the hyperlink and using the second user device (and/or another device associated with the second user or second account) and input the change to the additional data. Accordingly, the system may modify, in the second repository and based on the change, the additional data associated with the new list item; modify, in the master repository and based on the change, the entry associated with the new list item; and generate, in the record repository, a record of the change.

Figure 1C:
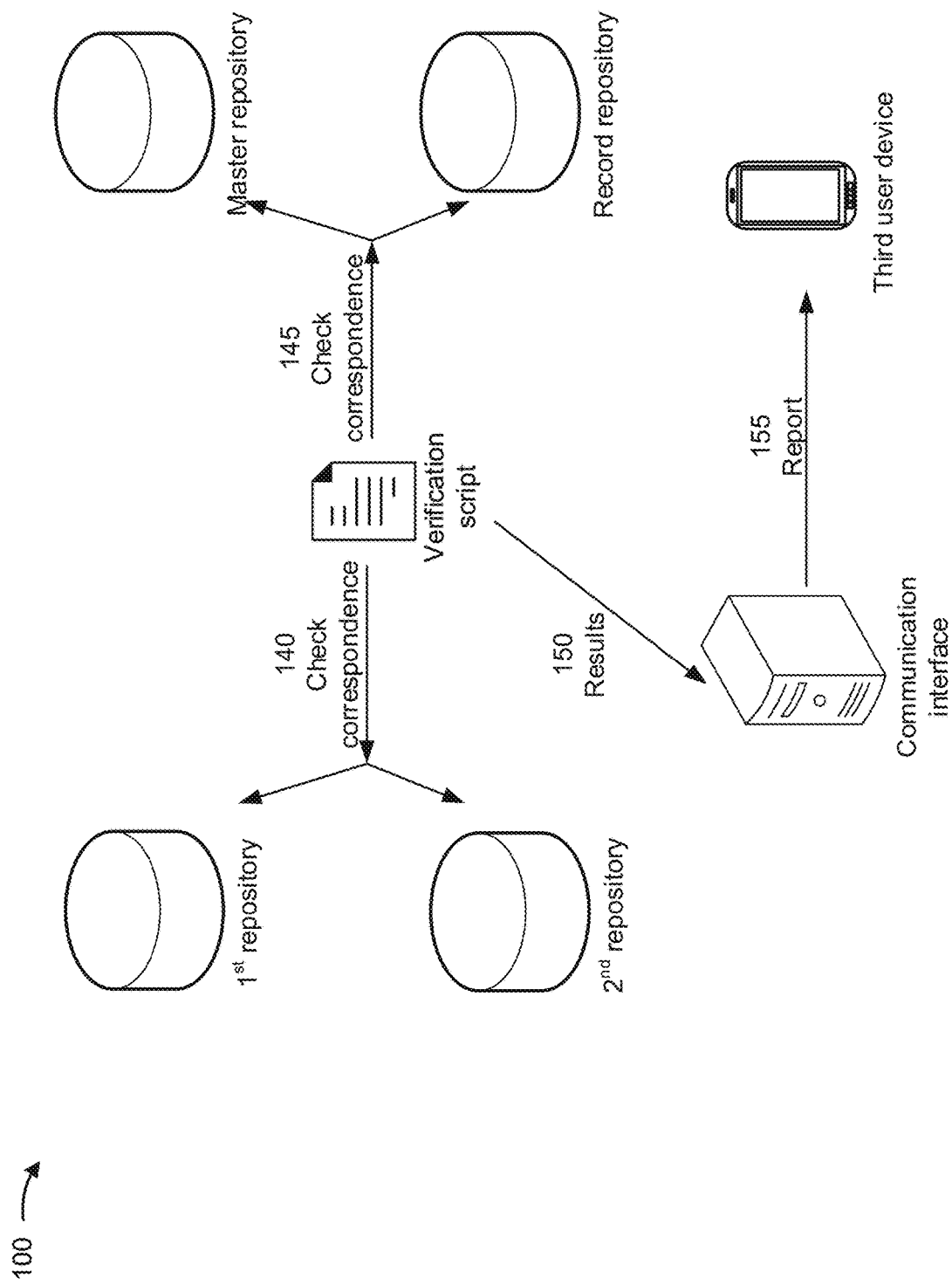

As shown in FIG. 1C, and by reference numbers 140 and 145, the system may perform one or more verifications for the new list item. For example, as shown by reference number 140, the system may verify that an identifier associated with the data in the first repository corresponds to an identifier associated with the additional data in the second repository. Accordingly, the system may verify that each list item in the first repository is associated with a corresponding item in the second repository. Additionally, or alternatively, and as shown by reference number 145, the system may verify that the modified entry in the master repository corresponds to the record of the entry and the record of the modified entry in the record repository. Accordingly, the system may verify that each list item in the master repository includes data from a corresponding item in the first repository and includes additional data from a corresponding item in the second repository. Additionally, or alternatively, the system may verify that the modified entry in the master repository corresponds to the data in the first repository and the additional data in the second repository. Accordingly, the system may verify that each list item in the master repository includes data from a most recent record corresponding to that item in the record repository.

As shown by reference number 150, the system may output a notification based on the one or more verifications. For example, the system may generate one or more strings based on outcomes (e.g., Boolean outcomes) from the one or more verifications. The strings may indicate any row numbers or other item identifiers that include "1st line and 2nd line mismatches," "1st line+2nd line and master mismatches," and/or "Master and SOR mismatches." In some implementations, the system may generate a report indicating "No errors found in the inventory!" when the one or more verifications are all successful.

As shown by reference number 155, the system may use a communication interface to transmit the notification, based on the one or more verifications, to a third user device. Accordingly, the notification may include an email, a text message, a chat message, and/or another message. The third user device may access the notification using credentials (e.g., a username and password, a key associated with an SSO session) associated with a third account or third user (or one user of a third set of users). In some implementations, the third user may include the administrator described above.

In some implementations, the system may determine which users in the third set of users will receive the notification based on one or more settings. For example, the system may send the notification to one user in the third set of users based on one stored setting that indicates the system should send the notification to that user, but may refrain from sending the notification to a different user in the third set of users based on a different stored setting that indicates the system should not send the notification to that user.

Additionally, or alternatively, the system may determine which type of notification to send based on one or more settings. For example, the system may send an email to one user in the third set of users based on one stored setting that indicates the system should send emails to that user, but may send a chat message to a different user in the third set of users based on a different stored setting that indicates the system should send chat messages to that user.

Figure 1D:
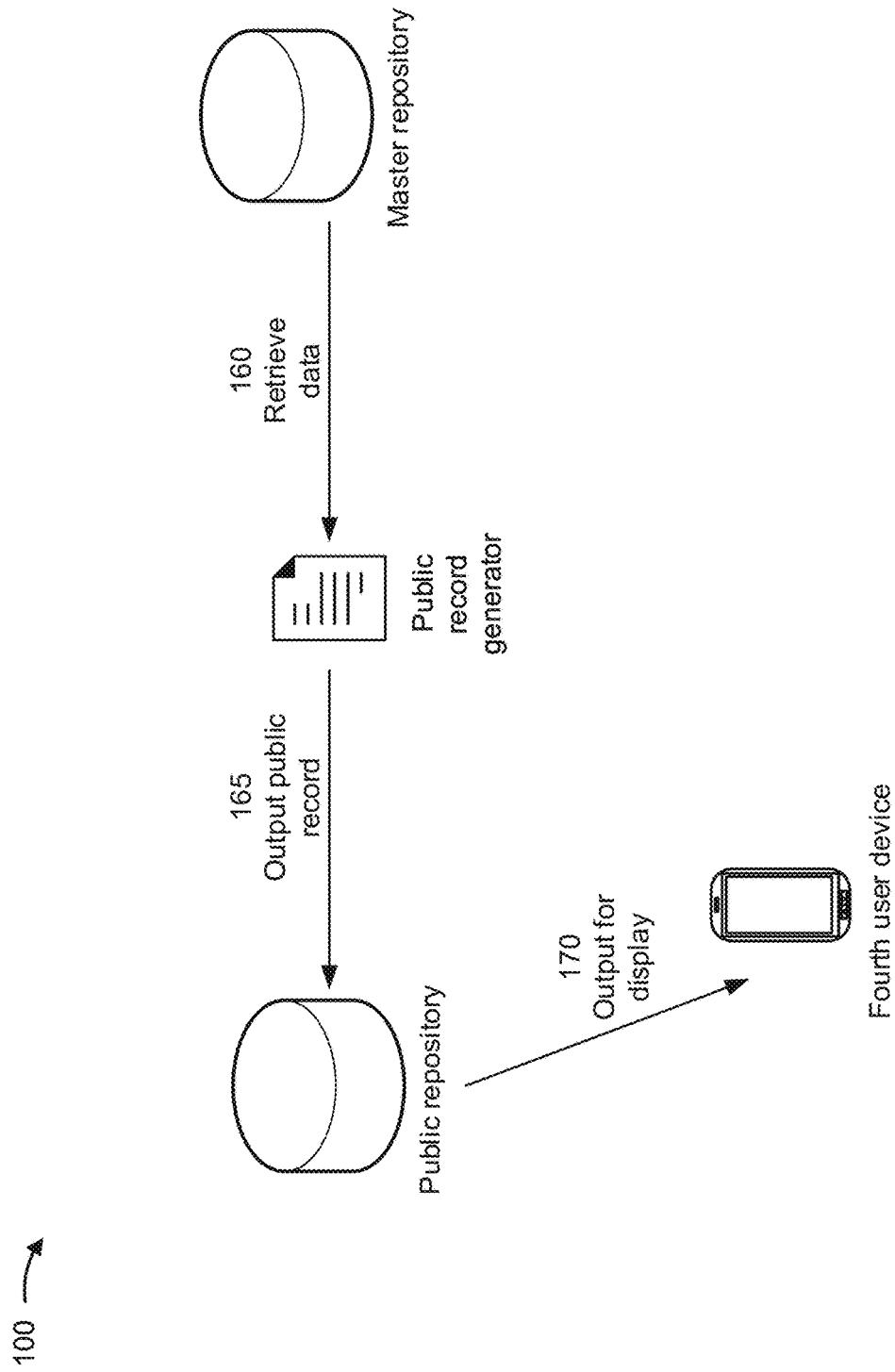

As shown in FIG. 1D, and by reference number 160, the system may retrieve a new entry from the master repository. For example, the system may retrieve new entries periodically. Additionally, or alternatively, the master repository may push each new entry to the system after the new entry is written (e.g., as described above). Additionally, as shown by reference number 165, the system may output, to the public repository and based on the master repository, the new entry with at least one data value removed. For example, the system may remove one or more email addresses associated with the new entry, one or more timestamps associated with the new entry, a risk assessment associated with the new entry, a validation status associated with the new entry, and/or other sensitive data associated with the new entry.

In some implementations, the system may update the public repository in approximately real-time. For example, based on receiving the data associated with the new list item, the system may output, to the public repository and based on the master repository, the entry, associated with the new list item, with at least one data value removed. Additionally, based on receiving the additional data associated with the new list item, the system may modify the public repository based on the additional data.

As shown by reference number 170, the system may output entries from the public repository for display (e.g., by a fourth user device as shown in example 100). For example, the system may output the entries for display in response to a request, from the fourth user device, to view the public repository. The fourth user device may access the public repository using credentials (e.g., a username and password, a key associated with an SSO session) associated with a fourth account or fourth user (or one user of a fourth set of users). In some implementations, the fourth user may include any of the first user, the second user, the third user, the administrator, and/or a different user. Accordingly, the public repository may be a read-only repository accessible by the first user, the second user, the third user, the fourth user, the administrator, and/or additional users.

By using the techniques described above, a system can collect information from multiple sets of users without compromising security of the first-line storage, the second-line storage, the consolidated storage, and the system of record. As a result, the system can automatically collate the information with greater speed, accuracy, and security than existing techniques. Additionally, in some implementations, the system can further automatically error-check and verify the information. As a result, the system can improve user experience by making error correction faster, easier, and more accurate than under existing techniques. Additionally, in some implementations and as described above, the system can automatically produce a public-facing version of the consolidated storage. Accordingly, the system can further improve user experience, while maintaining security, by increasing speed and efficiency with which a portion of the information can be publicly shared.

As indicated above, FIGS. 1A-1D are provided as an example. Other examples may differ from what is described with regard to FIGS. 1A-1D.

FIGS. 2A and 2B are diagrams of example graphical user interfaces (GUIs) 200 and 250, respectively, that may be used by systems and/or methods described herein. For example, one or more components of example GUI 200 depicted in FIG. 2A may be used to receive data from a first user (e.g., as described above in connection with FIG. 1A). Accordingly, example 200 may be a first form used to collect data from the first user or one of a first set of users. Similarly, one or more components of example GUI 250 depicted in FIG. 2B may be used to receive additional data from a second user (e.g., as described above in connection with FIG. 1A). Accordingly, example 250 may be a second form used to collect additional data from the second user or one of a second set of users.

As shown in FIG. 2A, example 200 includes text boxes and drop-down menus to collect data associated with a new list item, such as a "Name" for the new list item, a "Purpose" for the new list item, a "Division," "Business Unit," "Business Sub-Unit," and/or other categorizations for the new list item, and/or an "Owner" for the new list item (which may be a name, email, and/or other identifier of a user). In some implementations, example 200 may further include checkboxes to collect data associated with the new list item, such as an indicator of one or more "Environments" for the new list item and/or an indicator of whether and which kinds of "Sensitive Data" the new list item is associated with. Example 200 further includes a button ("Next") or other similar component to trigger transmission of the data to a system that generated example GUI 200.

As shown in FIG. 2B, example 250 includes forms that may be pre-populated by the system that generated example GUI 250. For example, the system may populate form 252 with an identifier associated with the new list item (in "Standard Name") and populate form 254 a categorization associated with the new list item (in "Division"). Example 250 may further include ratio buttons and text boxes to collect additional data associated with the new list item, such as an "Overall Risk" category for the new list item, a "Severity" category for the new list item, any "Notes" for the new list item, a link to a "Validation/Documentation Folder" for the new list item, and/or a link to an "Approved Risk Assessment" for the new list item. Example 250 further includes a button ("Submit") or other similar component to trigger transmission of the additional data to a system that generated example GUI 250.

As indicated above, FIGS. 2A and 2B are provided as examples. Other examples may differ from what is described with regard to FIGS. 2A and 2B.

Figure 3:
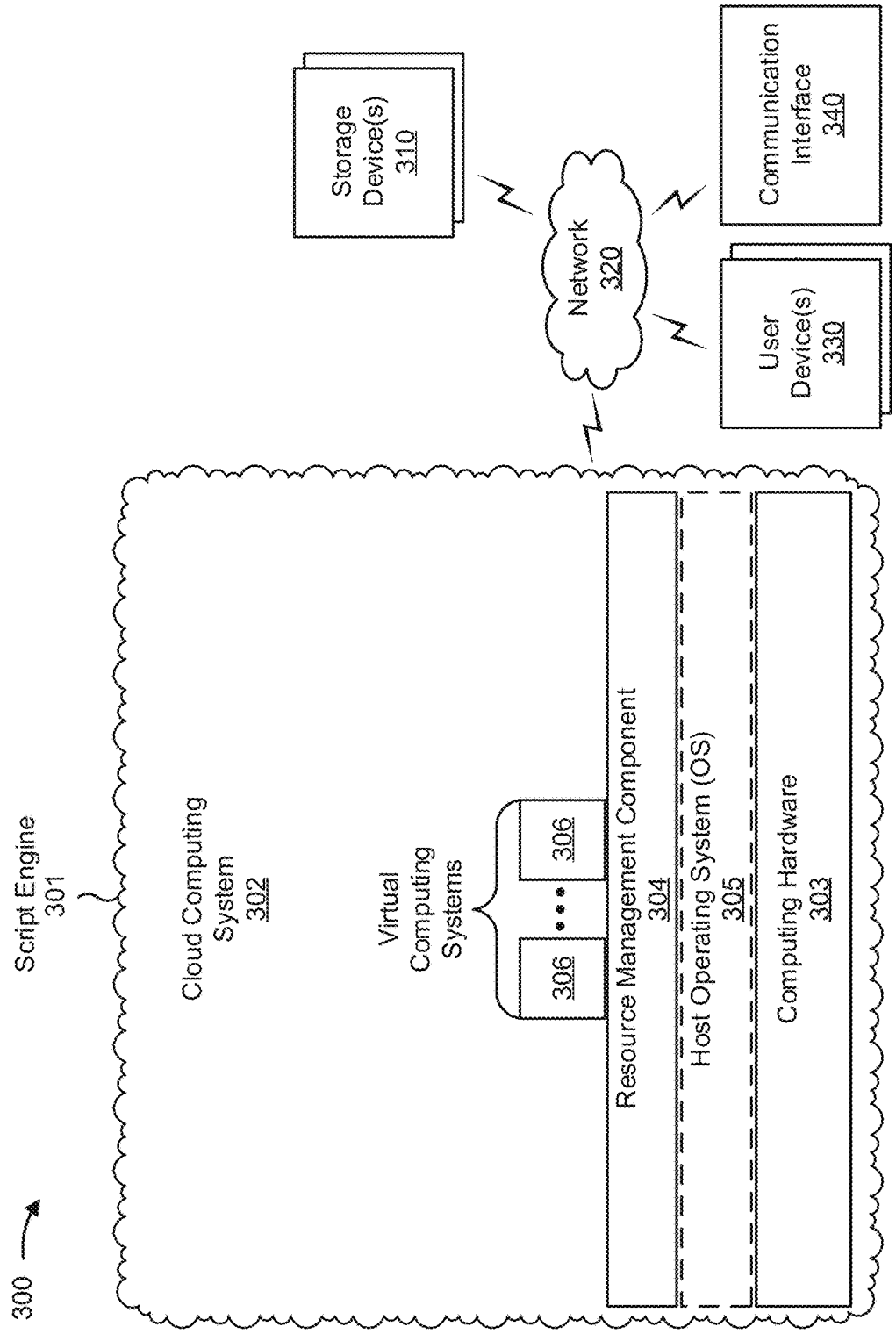
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a script engine 301, which may include one or more elements of and/or may execute within a cloud computing system 302. The cloud computing system 302 may include one or more elements 303-306, as described in more detail below. As further shown in FIG. 3, environment 300 may include one or more storage devices 310, a network 320, one or more user devices 330, and/or a communication interface 340. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. Examples of computing hardware are described elsewhere herein (e.g., with respect to FIG. 4).

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines. Additionally, or alternatively, the resource management component 304 may include a container manager, such as when the virtual computing systems 306 are containers. In some implementations, the resource management component 304 executes within and/or in coordination with a host operating system 305.

A virtual computing system 306 includes a virtual environment that enables cloud-based execution of operations and/or processes described herein using computing hardware 303. A virtual computing system 306 may execute one or more applications using a file system that includes binary files, software libraries, and/or other resources required to execute applications on a guest operating system (e.g., within the virtual computing system 306) or the host operating system 305.

Although the script engine 301 may include one or more elements 303-306 of the cloud computing system 302, may execute within the cloud computing system 302, and/or may be hosted within the cloud computing system 302, in some implementations, the script engine 301 may not be cloud-based (e.g., may be implemented outside of a cloud computing system) or may be partially cloud-based. For example, the script engine 301 may include one or more devices that are not part of the cloud computing system 302, such as device 400 of FIG. 4, which may include a stand-alone server or another type of computing device. The script engine 301 may perform one or more operations and/or processes described in more detail elsewhere herein.

Storage device(s) 310 may be implemented on a cloud computing system at least partially integrated with cloud computing system 302 (e.g., as computing hardware 303) or distinct from cloud computing system 302 (e.g., as a standalone server). In some implementations, storage device(s) 310 may include one or more devices (e.g., one or more servers) that are not part of a cloud computing system, such as device 400 of FIG. 4, which may include a standalone server or another type of computing device. Storage device(s) 310 may include access-restricted repositories, such as a first repository, a second repository, a master repository, and/or a record repository, as described elsewhere herein. Additionally, in some implementations, storage device(s) 310 may include a public repository, as described elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

User device(s) 330 may include one or more devices capable of generating, storing, and/or providing data (and/or additional data) associated with a new list item. User device(s) 330 may include a communication device and/or a computing device. For example, user device(s) 330 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. Additionally, or alternatively, user device(s) 330 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. User device(s) 330 may transmit data associated with a new list item (e.g., to script engine 301) and may transmit additional data associated with the new list item (e.g., to script engine 301). Additionally, or alternatively, user device(s) 330 may receive notifications from script engine 301 and/or view a public repository, as described elsewhere herein.

Communication interface 340 may be implemented on a cloud computing system at least partially integrated with cloud computing system 302 (e.g., as computing hardware 303) or distinct from cloud computing system 302 (e.g., as a standalone server). In some implementations, the communication interface 340 may include one or more devices (e.g., one or more servers) that are not part of a cloud computing system, such as device 400 of FIG. 4, which may include a standalone server or another type of computing device. The communication interface 340 may deliver notifications from script engine 301 to user device(s) 330, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
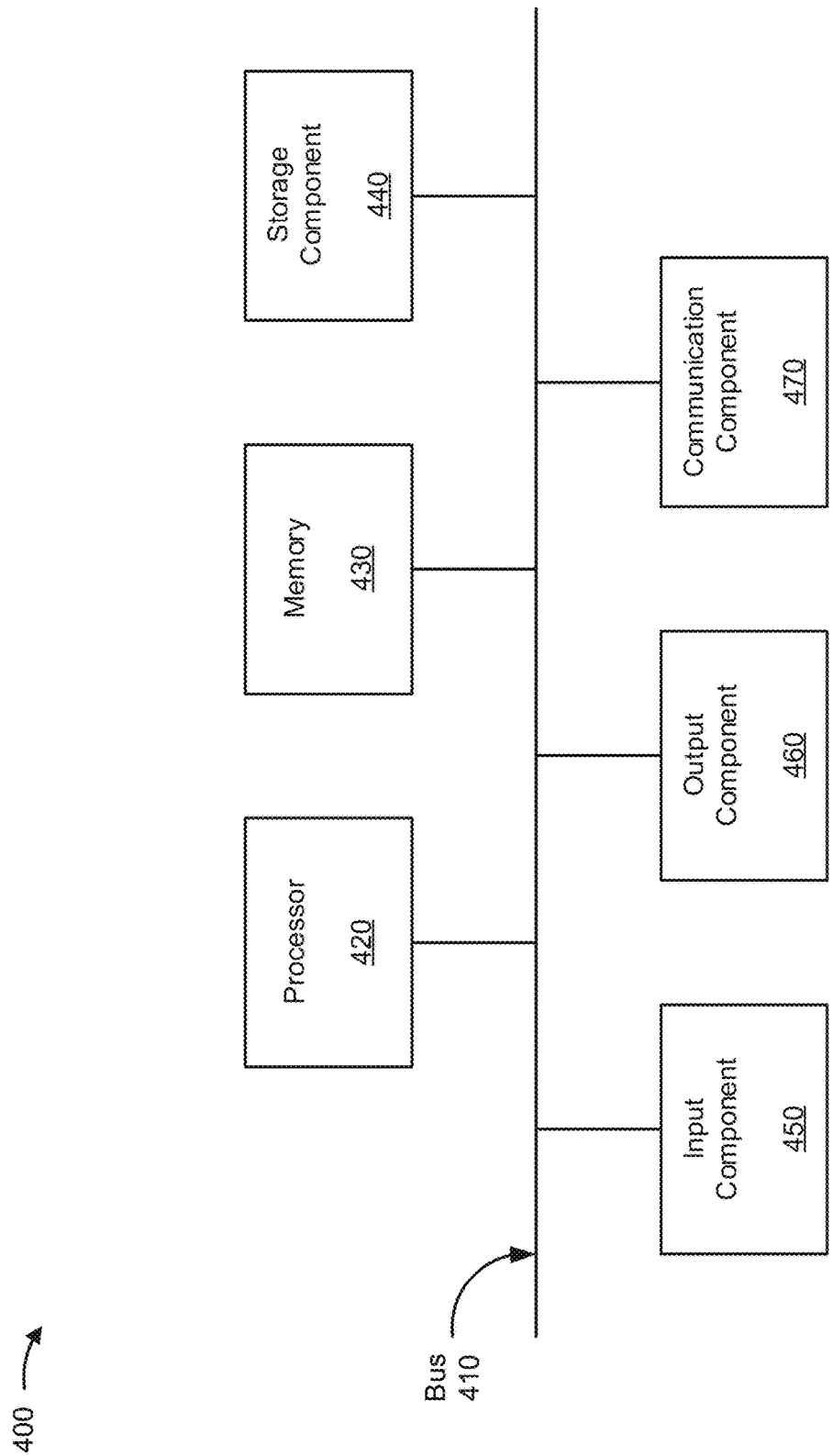
FIG. 4 is a diagram of example components of one or more devices of FIG. 3.

FIG. 4 is a diagram of example components of a device 400, which may correspond to storage device(s) 310, user device(s) 330, and/or communication interface 340. In some implementations, storage device(s) 310, user device(s) 330, and/or communication interface 340 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
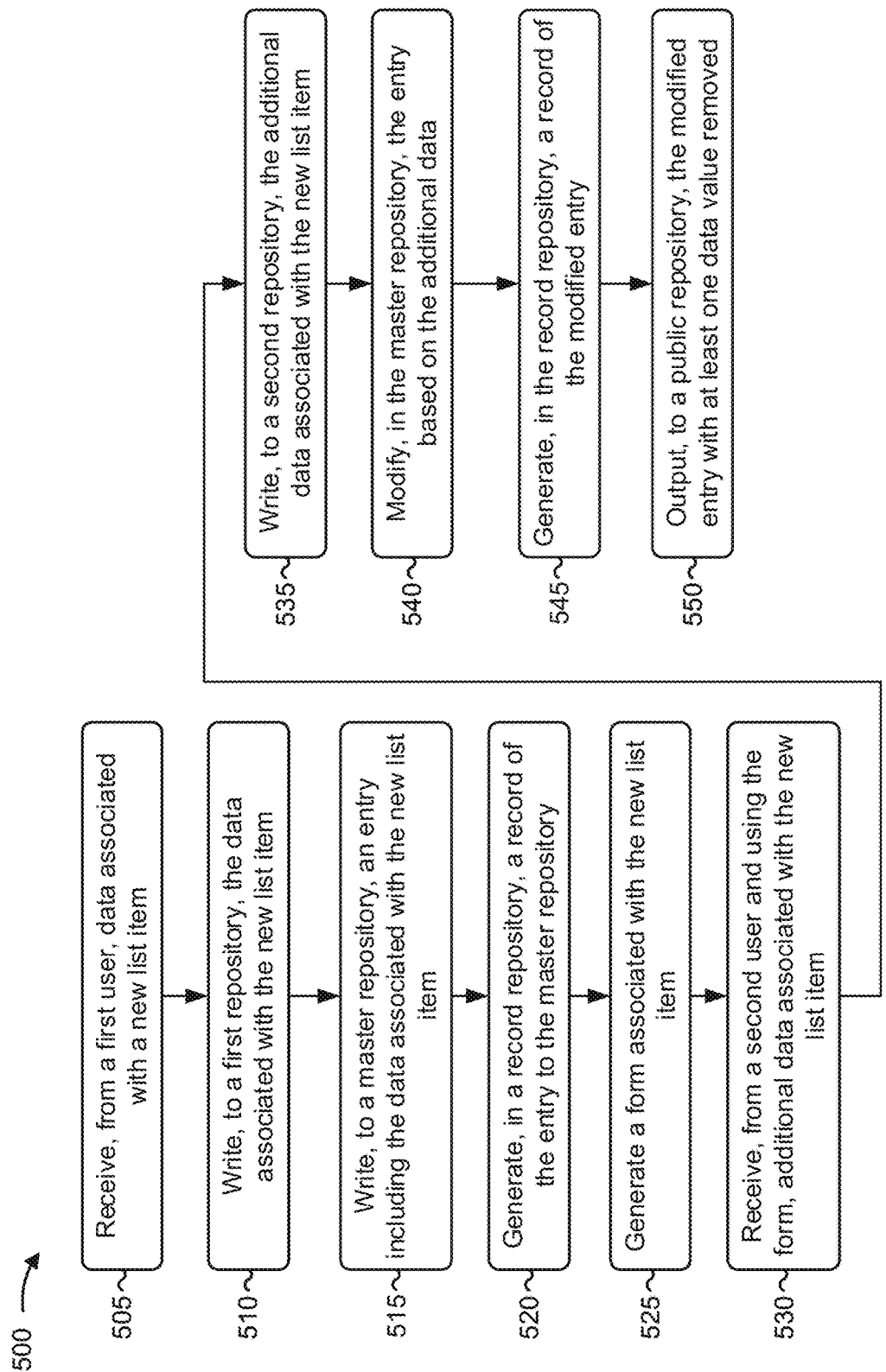
FIG. 5 is a flowchart of an example process relating to automatically building and securing a master data list.

FIG. 5 is a flowchart of an example process 500 associated with automatic building, verifying, and securing of a master data list. In some implementations, one or more process blocks of FIG. 5 may be performed by a system (e.g., script engine 301). In some implementations, one or more process blocks of FIG. 5 may be performed by another device or a group of devices separate from or including the system, such as storage device(s) 310, user device(s) 330, and/or communication interface 340. Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving, based on input received in association with a first user, data associated with a new list item (block 505). In some implementations, the new list item is to be added to a master list that is associated with multiple sets of users having different access permissions to items in the master list. As further shown in FIG. 5, process 500 may include writing, to a first repository, the data associated with the new list item (block 510). In some implementations, the first repository may be restricted to a first set of users. As further shown in FIG. 5, process 500 may include writing, to a master repository, an entry including the data associated with the new list item (block 515). In some implementations, the master repository may be restricted to a second set of users. As further shown in FIG. 5, process 500 may include generating, in a record repository, a record of the entry to the master repository (block 520). In some implementations, the record repository may be restricted to a third set of users. As further shown in FIG. 5, process 500 may include generating, based on receiving the data associated with the new list item, a form associated with the new list item (block 525). As further shown in FIG. 5, process 500 may include receiving, based on input received in association with a second user and using the form, additional data associated with the new list item (block 530). As further shown in FIG. 5, process 500 may include writing, to a second repository, the additional data associated with the new list item (block 535). In some implementations, the second repository may be restricted to the first set of users. As further shown in FIG. 5, process 500 may include modifying, in the master repository, the entry including the data associated with the new list item based on the additional data associated with the new list item (block 540). As further shown in FIG. 5, process 500 may include generating, in the record repository, a record of the modified entry (block 545). As further shown in FIG. 5, process 500 may include outputting, to a public repository and based on the master repository, the modified entry with at least one data value removed (block 550). In some implementations, the public repository may be a read-only repository accessible by the first user, the second user, the first set of users, the second set of users, and the third set of users.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for automatically building and securing a master data list, the system comprising:
one or more memories; and
one or more processors, communicatively coupled to the one or more memories, configured to:
receive, based on input received in association with a first account, data associated with a new list item;
write, to a first repository that is restricted to a first set of users, the data associated with the new list item to be added to a master list that is associated with multiple sets of users having different access permissions to items in the master list;

write, to a master repository that is restricted to a second set of users, an entry including the data associated with the new list item,
   wherein the second set of users is distinct from the first set of users;

generate, in a record repository that is restricted to a third set of users, a record of the entry to the master repository,
   wherein the third set of users is distinct from the first set of users and the second set of users;

generate, based on receiving the data associated with the new list item, a form associated with the new list item;

receive, based on input received in association with a second account and using the form, additional data associated with the new list item;

write, to a second repository that is restricted to the first set of users, the additional data associated with the new list item;

modify, in the master repository, the entry including the data associated with the new list item based on the additional data associated with the new list item;

generate, in the record repository, a record of the modified entry; and output, to a public repository and based on the master repository, the modified entry with at least one data value removed.

2. The system of claim 1, wherein the first set of users is associated with the second account, the second set of users is associated with an administrator and the second account, and the third set of users is associated with the administrator.

3. The system of claim 1, wherein the public repository is a read-only repository accessible by the first account, the first set of users, the second set of users, and the third set of users.

4. The system of claim 1, wherein the one or more processors are further configured to:
   perform at least one verification including:
      verifying that an identifier associated with the data in the first repository corresponds to an identifier associated with the additional data in the second repository,
      verifying that the modified entry in the master repository corresponds to the data in the first repository and the additional data in the second repository, or
      verifying that the modified entry in the master repository corresponds to the record of the entry and the record of the modified entry in the record repository; and
   output a notification based on the at least one verification.

5. The system of claim 1, wherein the one or more processors are further configured to:
   generate an additional form for display on a device associated with the first account; and
   wherein the data associated with the new list item is received using the additional form.

6. The system of claim 1, wherein the one or more processors, when generating the form associated with the new list item, are configured to:
   populate a first field of the form with an identifier associated with the new list item; and
   populate a second field of the form with a categorization associated with the new list item.

7. The system of claim 1, wherein the one or more processors, when modifying the entry including the data associated with the new list item, are configured to:
   map the additional data to the entry based on an identifier associated with the new list item; and
   populate the entry with at least one new data value based on the additional data.

8. The system of claim 1, wherein the one or more processors, when generating the record of the entry to the master repository, are configured to:
   identify the entry based on an identifier associated with the new list item, and
   copy the entry, along with an associated timestamp, to the record repository; and
   wherein the one or more processors, when generating the record of the modified entry, are configured to:
      identify the modified entry based on the identifier associated with the new list item, and
      copy the modified entry, along with an associated timestamp, to the record repository.

9. A method of automatically building and verifying a master data list, comprising:
   receiving, based on input associated with a first user and using a first form, data associated with a new database entry to be added to a master database that is associated with multiple sets of users having different access permissions to entries in the master database;
   writing, to a first repository, the data associated with the new database entry;
   writing, to a master repository, an entry including the data associated with the new database entry;
   generating, in a record repository, a record of the entry to the master repository;
   generating, based on receiving the data associated with the new database entry, a second form associated with the new database entry;
   receiving, based on input associated with a second user and using the second form, additional data associated with the new database entry,
      wherein the second user is distinct from the first user;
   writing, to a second repository, the additional data associated with the new database entry;
   modifying, in the master repository, the entry including the data associated with the new database entry based on the additional data associated with the new database entry;
   generating, in the record repository restricted to a third user, a record of the modified entry,
      wherein the third user is restricted from the first user and the second user;
   performing a plurality of verifications including:
      verifying that an identifier associated with the data in the first repository corresponds to an identifier associated with the additional data in the second repository,
      verifying that the modified entry in the master repository corresponds to the data in the first repository and the additional data in the second repository, and
      verifying that the modified entry in the master repository corresponds to the record of the entry and the record of the modified entry in the record repository; and
   outputting a notification based on the plurality of verifications.

10. The method of claim 9, further comprising:
   generating a hyperlink to the first form for editing the data in the first repository;

receiving, based on input associated with the first user and using the hyperlink, a change to the data associated with the new database entry;

modifying, in the first repository and based on the change, the data associated with the new database entry;

modifying, in the master repository and based on the change, the entry associated with the new database entry; and generating, in the record repository, a record of the change.

11. The method of claim 9, further comprising:

generating a hyperlink to the second form for editing the data in the second repository;

receiving, based on input associated with the second user and using the hyperlink, a change to the additional data associated with the new database entry;

modifying, in the second repository and based on the change, the additional data associated with the new database entry;

modifying, in the master repository and based on the change, the entry associated with the new database entry; and generating, in the record repository, a record of the change.

12. The method of claim 9, further comprising:

outputting, based on receiving the additional data, a notification including an identifier associated with the new database entry.

13. The method of claim 9, further comprising:

determining that the additional data associated with the new database entry satisfies at least one condition; and outputting a notification based on determining that the additional data satisfies the at least one condition.

14. The method of claim 9, wherein the first repository and the second repository are not accessible by the first user and are accessible by the second user, the master repository is not accessible by the first user and is accessible by an administrator and the second user, and the record repository is not accessible by the first user and the second user and is accessible by the administrator.

15. A non-transitory computer-readable medium storing a set of instructions for automatically building and securing a master data list, the set of instructions comprising:

one or more instructions that, when executed by one or more processors of a device, cause the device to:

receive input, associated with one user of a first set of users, that includes data associated with a new list item to be added to a master list that is associated with multiple sets of users having different access permissions to items in the master list;

write, to a first repository that is not accessible by the first set of users, the data associated with the new list item;

write, to a master repository that is not accessible by the first set of users, an entry including the data associated with the new list item;

generate, in a record repository that is not accessible by the first set of users, a record of the entry to the master repository;

generate, based on receiving the data associated with the new list item, a form associated with the new list item;

receive input, associated with one user of a second set of users and using the form, that includes additional data associated with the new list item, wherein the first set of users is distinct from the second set of users;

write, to a second repository that is not accessible by the first set of users and by the second set of users and restricted to a third set of users, the additional data associated with the new list item, wherein the third set of users is distinct from the first set of users and the second set of users;

modify, in the master repository, the entry including the data associated with the new list item based on the additional data associated with the new list item, wherein the master repository is accessible by the second set of users; and generate, in the record repository, a record of the modified entry, wherein the record repository is not accessible by the second set of users.

16. The non-transitory computer-readable medium of claim 15, wherein the one or more instructions, that cause the device to write the data associated with the new list item to the first repository, cause the device to:

generate an identifier, for association with the data, based on one or more existing identifiers stored in the first repository; and write the identifier to the first repository in addition to the data.

17. The non-transitory computer-readable medium of claim 15, wherein the one or more instructions, when executed by the one or more processors, further cause the device to:

output, to a public repository and based on the master repository, the entry with at least one data value removed.

18. The non-transitory computer-readable medium of claim 17, wherein the one or more instructions, when executed by the one or more processors, further cause the device to:

modify the public repository based on the additional data and the modified entry.

19. The non-transitory computer-readable medium of claim 15, wherein the one or more instructions, that cause the device to receive the data associated with the new list item, cause the device to:

receive the data associated with the new list item from a database including a plurality of new list items; and wherein the one or more instructions, that cause the device to receive the additional data associated with the new list item, cause the device to:

receive the additional data associated with the new list item from the database including the plurality of new list items.

20. The non-transitory computer-readable medium of claim 15, wherein the one or more instructions, when executed by the one or more processors, further cause the device to:

perform at least one verification including:

verifying that an identifier associated with the data in the first repository corresponds to an identifier associated with the additional data in the second repository, verifying that the modified entry in the master repository corresponds to the data in the first repository and the additional data in the second repository, or verifying that the modified entry in the master repository corresponds to the record of the entry and the record of the modified entry in the record repository; and output a notification based on the at least one verification.

* * * * *